Oct. 4, 1966     L. LAZARE     3,276,996
SEPARATING WATER FROM SALINE SOLUTIONS
Filed July 15, 1963

INVENTOR
LEON LAZARE
BY
ROBERT CALVERT
ATTORNEY.

United States Patent Office 3,276,996
Patented Oct. 4, 1966

3,276,996
SEPARATING WATER FROM SALINE SOLUTIONS
Leon Lazare, 111 Hannah's Road, Stamford, Conn.
Filed July 15, 1963, Ser. No. 294,967
7 Claims. (Cl. 210—22)

This invention relates to the separation of water from saline solutions by a process which is best designated as thermo-osmosis. The invention is proposed for making, from the sea, a water which is suitable for drinking or irrigation.

The art known to me includes the following (1) G. Langenhammer and associates (Zeitschrift für Elektrochemie, vol. 62, 458–480, 1957). They report that they separate, by thermal diffusion, a liquid medium from a polymer dissolved therein, the liquid moving towards the warmer side of a cell having a temperature gradient. Although they work only with dilute solutions, their results demonstrate the principle of diffusion as influenced by temperature differential. (2) P. Debye and others in this field have established additionally the principle of transport induced by a temperature gradient. (3) R. Haase (Zeit. f. phys. Chemie, vol. 21, 244–69, 1959) and Haase and Steinert, id., 270–97, 1959. They studied rate of diffusion of water through cellophane membrane and modifications thereof, for various pressure and temperature differentials and at different temperature levels.

The present invention provides contemplated procedures for the movement of water away from ions by thermal transport through a special kind of membrane. Such a process, in which the thermal diffusion of water occurs relative to a fixed membrane, is referred to as thermo-osmosis.

The invention comprises the herein described thermo-osmosis process and membranes for use therein.

The invention will be illustrated by description in connection with the drawings.

FIG. 3 is a cross-section on an enlarged scale of a membrane in which the diaphragm proper is reinforced with a netting or the like.

Figure 1:
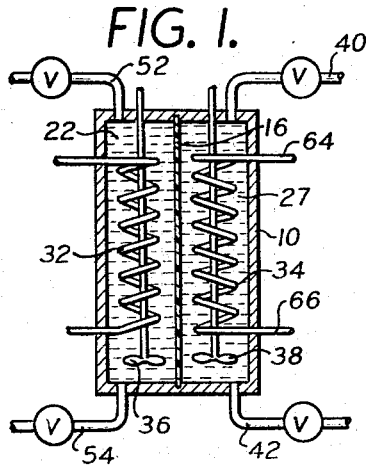
FIG. 1 is a vertical section of a simple form of apparatus illustrating the invention.
Figure 2:
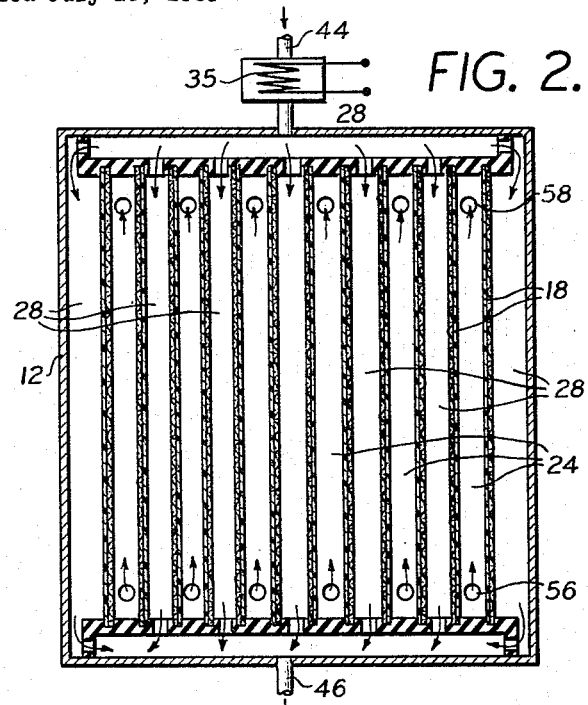
FIG. 2 is a vertical section of a multiple diaphragm unit.

Parts not shown in detail are conventional and the figures are in part diagrammatic. There are shown thermo-osmosis cells with walls 10, 12 and 14; diaphragms 16, 18, 20, and 21; saline solution at positions 22, 24 and 26; water at positions 27, 28, and within the tubes 20; temperature control equipment in the form of cooling coils 32, warming coils 34 and electrical heating elements 35 for the inlet water, stirrer 37 and stirrer 38; inlets for water at 40, 44 and 48; outlets for water at 42, 46, and 50; saline inlets 52, 56 and 60; outlets for saline solution at 54, 58, and 62; and heating steam (or warm water) inlets and outlets, respectively, at 64 and 66.

Figure 3:
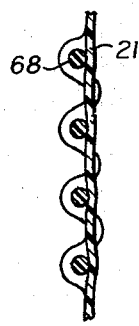

Diaphragm reinforcement is shown in FIG. 3 in the form of the screen 68 with the diaphragm material 21 applied thereover.

In operation, the saline is fed into one of the inlets therefor and water in amount to fill the other side of the cell (or the spaces around the multiple membranes), the water being warmed to a temperature above that of the saline, as described elsewhere herein.

In the simple cell of FIG. 1, the water is stirred so as to give changing contact with the water side of the diaphragm 16. In the other modifications, the rate of movement past the multiple diaphragms provide sufficient agitation and change of water on the surfaces of the diaphragms. The rate of movement of the saline through the saline-containing spaces in the thermo-osmosis cell is so controlled that the saline issuing from the cell will be concentrated substantially as, for instance, to 5%–10% of total salines in the issuing solution.

As to materials, the liquid upon which the process operates may be any solution of electrolytes in water such as industrial wastes, spent acid liquor from pickling iron or steel and salt lake, brackish or ordinary sea water.

The membrane, which constitutes the diaphragm when the unit is in operation, is one which is absorptive of water when immersed therein without itself dissolving; chemically inert to water and electrolytes such as salt or others to be processed; electrolyte excluding, i.e., only slightly or totally impermeable to electrolyte solutes such as are found in the solutions stated, in the absence of applied electrical potential; and the membrane is thermo-osmotic with respect to water, that is, transmits water therethrough under the influence of a temperature gradient through the diaphragm.

Examples of materials which meet these requirements and can be used as the chief component of the thermo-osmotic membranes are polymers and, for best results, cross-linked polymers of the following monomers: the N-vinyl lactams, examples of which are N-vinyl pyrrolidone and N-vinyl imidazole; $C_2$–$C_4$ alkylene oxides such as ethylene, propylene and butylene oxides; vinyl alcohol, made as the polyvinyl alcohol by hydrolysis of polyvinyl acetate; cellophane; cellulose acetate; and nitrocellulose, e.g., pyroxylin of degree of nitration about 11%–12% N.

The cross-linking is effected by any known procedure including exposure of the selected polymer in film form, to ionizing radiation, or chemical cross-linking of monomers, during polymerizing thereof, by polyfunctional agents. Examples of such cross-linking agents are polycarboxylic acids such as fumaric, oxalic, adipic, maleic and phthalic acids; any water soluble polyhydroxy compound disclosed herein for use as plasticizer; di-methhydroxy ethylene urea; organic di-isocyanates, e.g., hexamethylene, 2,4-tolylene, and 4,4'-diphenylmethane diisocyanate; and divinyl monomers, e.g., monomers having two ethenoid bonds (or groups) as in methylene bisacrylamide or the said divinyl monomers.

The chemical cross-linking is effected by direct co-polymerization in situ of the monomer and cross-linking agent. They are mixed together in the absence of oxygen but with an initiator of ethenoid bond polymerization and then warmed as to 60°–90° C. Suitable initiators are benzoyl, lauroyl, and t-butyl peroxide. Proportions of the cross-linking agent are approximately 0.1%–2% by weight of the mixed monomers.

When the membrane selected is not in itself sufficiently impermeable to the saline ions, that is, insufficient in electrolyte exclusion, the membrane may be and suitably is combined with a surface coating of extreme thinness which is less permeable to the ions of the saline than is the membrane itself. Because of the exceptional thinness of said coating, its decreased water permeability is acceptable. Examples of such superficial coatings that may be applied to the membranes of kind described are either in the form of the free acid or its sodium or other alkali metal salt; quaternary and tertiary amine derivatives of polyvinyl aromatic $C_{6-9}$ hydrocarbons such as polystyrene, polyvinyl toluene, and polyvinyl xylene, in which the group —$CH_2$—$N(CH_3)_3Cl$, for instance, is attached to a carbon of the aryl rings; melamine formaldehyde resins (e.g., 50%–70%) admixed with guanidine (30%–50%); and polyacrylic or polymethacrylic acid.

A suitable thickness of the ion impermeable coating is in the range of the thinnest possible film that it continuous up to a few microns, as, for example, 0.1–3 microns.

The coating may be applied in any usual manner as by first spraying on a solution of the vinyl aromatic monomer or polymer such as styrene or polystyrene in a volatile organic solvent therefor, as, for example, dichloromethane, evaporating the solvent, and then grafting or cross-linking the thus applied coating onto the main membrane.

Thus the sulfonation of the polymerized vinyl aromatic, such as polystyrene, is made in usual manner as, for example, by spraying or otherwise applying over the polymer in film form, a solution of sulfur trioxide-triethyl phosphate complex in dichloroethane or other volatile organic solvent therefor, subsequently evaporating the volatile solvent, and then washing out remaining soluble material, suitably with ethanol followed by water, to give the finished composite membrane. As the sulfonic acid derivative so made is used in contact with a metal salt, such as sodium chloride in sea water, the acid converts to the metal sulfonate.

I may introduce the usual plasticizers for flexibilizing effect on the membrane material, the plasticizer selected being one which is conventional for the particular material of which the membrane (diaphragm) is principally composed. It may be and suitably is so selected as also to affect to a major extent the degree of cross-linking and to control or modify the polymeric network structure and porosity of the washed diaphragm.

I also use a pore forming agent, to increase the osmotic properties of the diaphragm. I can and suitably do use as the agent the same material as that for the plasticizing effect. This dual purpose material, after serving as the plasticizer during formation of the membrane, serves as the pore former during and after said washing. Examples of such bifunctional components are dextrose, sucrose, and other sugars; water soluble polyhydroxy alcohols such as glycerol and ethylene, propylene, and polyethylene and polypropylene glycols and their water soluble ethers and esters, e.g., the monoethylether monoacetate of ethylene glycol, such as "Cellosolve" acetate; formamide and acetamide; mono-, di-, triacetin; diacetone alcohol; and like non-ionic materials. When the plasticizer selected is not water soluble or is omitted, then pore formation as described can be effected by the use of one of said agents as described.

The membrane selected may be reinforced in manner not to interfere with the maintenance economically of the temperature gradient. In one form I use an internal fabric of very low thermal conductance. Examples are woven fabrics of thin threads of the resinous material which is itself the principal component of the membrane, with the said membrane extending as a film across and closing the meshes. As an alternative, I may use thus a screen of other material such as polyvinyl chloride, nylon, polyester ("Dacron"), polypropylene, rayon, glass or the like, with any of the membrane materials described herein.

Suitable proportions of the plasticizer are 10–50 parts for 100 parts of the resinous polymer or copolymer in amount to flexibilize the membrane but always less than the amount that if used would liquefy the material of the membrane at temperatures as low as 80° C.

The membranes are suitably thin, for increasing the rate of thermo-osmosis therethrough for a given temperature differential. While various dimensions are permissible, the principal membrane may be as thin as can withstand the stress to which subjected during use as, for instance, 0.01–0.5 millimeter and at the maximum about 1–3 mm. Thicker membranes provide increased strength and thermal resistance but suffer from decreased rate of thermo-osmosis for a given temperature differential between face and back. Thicknesses above 0.5 mm. are ordinarily unnecessary, particularly when used in combination with the fabric reinforcement.

As to conditions of operation, the steeper the temperature gradient between the two sides of the membrane, the more rapid is the thermo-osmosis but, on the other hand, the greater consumption of heat in a given time. The difference in temperature ordinarily is about 5°–30° C., the higher temperature being on the side of the membrane from which the deionized water issues and the temperature difference between face and back of the membrane being less with the thin than with thicker membranes. In any event the temperature of the warmer side of the membrane (diaphragm) must be below that at which the membrane either dissolves or softens to an objectionable extent and above that of the saline solution on the other side of the diaphragm.

The flow of fluid streams, for reasons of heat economy, are counter-current to each other. The temperature of the saline solution increases as the solution moves along the membrane, because of heat conduction from the warmer side through the membrane. The temperature profile of this cold side is dependent on the inlet temperature, which may be the normal temperature of sea water, and on the ratio of waste (saline) stream to product stream (water).

The higher temperature on the water-issuing side of the membrane is maintained conveniently by recirculating through a heat exchanger, or by injecting steam into, a part of the water which has thermo-osmosed through the membrane in a previous cycle and returning the thus heated portion to the cell.

The velocity of movement of water and saline, in contact with the back and face, respectively, is kept as high as is feasible in order to reduce as much as possible the loss in temperature gradient through the hydrodynamic boundary layers. This effect may be enhanced by baffles or other conventional flow directors, to induce turbulence. The water that issues from the back of the membrane, as well as that supplied initially to said back, is substantially pure, that is, so low in ion content as to be suitable as a source of potable water or as water for agricultural purposes such as irrigation.

The invention will be further illustrated by description in connection with the following specific examples of the practice of it, proportions here and elsewhere herein being expressed as parts by weight unless specifically stated to the contrary.

*Example 1*

The principal component of the membrane, about 1 mm. thick in this example, is polyvinylpyrrolidone (PVP) with a glycerol-cross-linked polymeric structure such that the gel water value is approximately 50%. The membrane is thinly coated on the face (saline side) with the sodium salt of polystyrene sulfonic acid, as to a thickness of approximately 3 microns, this polyelectrolyte salt being formed and graft polymerized onto the PVP membrane as described above. The membrane of area approximately 25 sq. cm. is disposed as the divider between two stirred cells of 400 ml. capacity each, one cell being maintained at 25° C. and containing 3% saline (NaCl) solution, and the other being warmed to 45° C. and containing pure water and each cell being provided with good agitation and cooling and heating coils to maintain substantially isothermal conditions throughout each cell. In such a system, water will pass from the saline solution in the cooler cell into the water in the warmer cell, a suitable rate being approximately 15 ml. per hour.

The method of manufacture or casting of the membrane, including the method of cross-linking, does not appreciably modify the membrane behavior so long as the gel water, i.e., the water content at which the membrane retains a firm condition at the temperatures of use constitutes approximately 50% of the membrane phase.

When ionizing radiation is the agent used to promote cross-linking, the dosage is approximately 150,000 rads. The cross-linking material, here glycerol, is used in the proportion of approximately 1 mole to 35 monomeric units of the PVP.

Example II

The procedure, equipment, and materials of Example I are used, except that the coating with said sodium salt is omitted. The result is decreased resistance to passage of ions through the membrane.

Example III

The materials, equipment and procedure of Example I are used, except that the membrane here consists of polyvinyl alcohol (PVOH) cross-linked with glycerol, so that the gel water content is approximately 50%, and a different coating on the face thereof is used.

The manufacture of the membrane for this example involves casting a film of linear polyvinyl alcohol in methanol solution with 35% of glycerol on the weight of the PVOH, as a plasticizer and pore-former, thereafter evaporating off the methanol, and cross-linking the membrane by exposure to 150,000–200,000 rads of ionizing radiation.

The salt exclusion coating prepared by applying a thin film of aqueous solution of formaldehyde and p-hydroxybenzene sulfonic acid to the face of the membrane that is to contact the saline solution, drying in vacuo, and then heating said face at 120° C. for 1½ hours.

Example IV

The materials, procedure and equipment of Example I are employed except that the membrane there used is replaced, separately and in turn, by membranes of the following materials:

(1) Polyethylene oxide, cross-linked with glycerol, the gel water being approximately 30%–50%. The coating applied on the face of the membrane consists of a 2-micron film of polystyrene quaternary amine and formaldehyde condensate.

To make this composite membrane, I supply sulfuric acid cold to the polyethylene oxide surface, wash off the remaining sulfuric acid from the surface after a few minutes of contact, and then add thereover a mixture of quaternary amine, such as trimethyl ammonium chloride, with formaldehyde in about equimolecular proportions. As a result of this treatment the polyethylene oxide is given a thin facing of the salt-excluding material.

(2) Cross-linked hydroxymethyl cellulose, 1 millimeter thick with a coating of sodium carboxymethyl cellulose, 1–2 microns in thickness, sprayed on from an aqueous solution and then warmed until the coating is firm.

(3) Cross-linked methyl or ethyl cellulose 1 mm. thick with a coating of polystyrene sulfonic acid 1–2 microns, applied in any usual manner. The cross-linking of the hydroxymethyl, methyl or ethyl cellulose is effected by applying thereover ethylene glycol or an ethanol solution of dimethoxyethylene urea, exposing the assembly to ultraviolet light, and then warming the whole to remove any volatiles.

Example V

The membrane made in Example I is assembled in the structure shown in FIG. 3. The plate and frame configuration is so constructed as to have dimensions of membrane about 2 feet by 3 feet, with spaces approximately ⅜ inches between adjacent membranes. The plate and frame assembly may be approximately 15 feet in length and contain 450 membranes of about 2,700 square feet total area. The compartments on each side of the membranes alternate, warm and cold, and are gasketed or formed in their settings, to prevent mixing of streams. The salt water is on the cold side and the purified water on the hot side of the several membranes. For a capacity of 10,000,000 gallons per day, to satisfy the water requirements for a representative community of approximately 100,000 persons, approximately 80 such assemblies are estimated as needed. Suitable operating conditions would be: total feed water 16,300,000 gallons per day at 20° C. and of salt content 3%, waste stream approximately 6,800,000 gallons per day containing 7.5 percent salt, at a temperature of 56.6° C.; 10,000,000 gallons net per day of desalinated water (including some condensed steam from the injector) leaving the units. The heat requirements for such a facility are estimated at $5.2 \times 10^9$ B.t.u. per day for which exhaust steam is satisfactory.

Example VI

Figure 4:
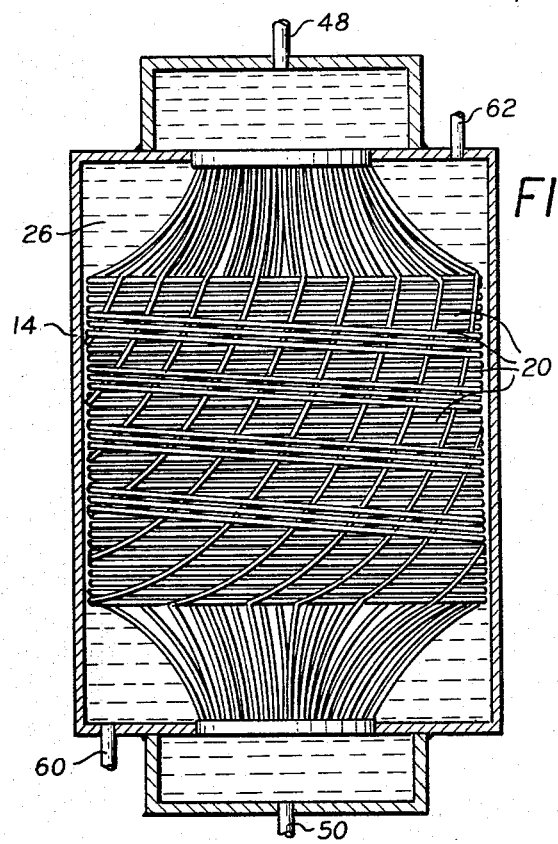
FIG. 4 is a vertical section of a modified form of thermo-osmosis unit in which the membrane is in the form of a twisted assembly of tubes.

The materials, equipment and procedure of Example V are used except that, instead of the plate-and-frame type of assembly, the membrane is manufactured in the form of flexible tubes of wall thickness 1 mm. thick and diameter 25 mm. The salt-exclusion coating is on the tube exterior. The tubes are intermeshed together into bundles, consisting of 120 tubes each 60 feet long. The 120 tubes are manifolded to a header box at each end and the tubes are intertwined together in a basket weave pattern as shown in FIG. 4 and of size to fit in a shell 3 feet in diameter by 12 feet in length. The saline solution such as one of 3% salt concentration flows outside the tubes, the separated water inside. For a 10,000,000 gallons per day facility, 138 such bundles are estimated as needed, suitably arranged in a parallel-series arrangement as follows:

| Parallel | Series | Total |
|---|---|---|
| 10 | 3 | 30 |
| 12 | 3 | 36 |
| 16 | 2 | 32 |
| 20 | 2 | 40 |

Such an arrangement will provide a sufficiently high velocity in shell side and tube side as to render negligible the inefficiencies due to temperature gradient through the hydrodynamic boundary layers on either side of the membrane.

The foregoing Examples V and VI, include proposed operating conditions that are specific for a given membrane. I have found that phenominological theory of irreversible processes may, for most purposes, be applied to these processes. I have thus analyzed mathematically the steady-state process for these cases and found that the important physical parameters, which determine the operating conditions and membrane areas for a given amount of recovery of desalinated water and concentrate to be returned to the ocean, are the ratios $C_1DS_T/K$ and $C_1DS_T/d$ where $C_1$ is the weight fraction of gel water for the membrane, D is the diffusion coefficient of water in the membrane, $S_T$ is the Soret coefficient, K is the thermal conductivity of the membrane and $d$ is the membrane thickness. By modifying the preparation of the membranes, e.g., varying the degree of cross-linking, the chemical composition, and the polymeric structure, I find that the parameter $C_1DS_T/K$ will be in the range about $-0.02$ to $-0.05$ c.g.s. units and $C_1DS_T$ will then be in the range $-0.8 \times 10^{-5}$ to $-3.0 \times 10^{-5}$ unit, and for a thickness $d$ (of membrane) 1.0 millimeter, $C_1DS_T/d$ will then be $-0.8 \times 10^{-4}$ to $-3.0 \times 10^{-4}$. Therefore the membranes used in Examples V and VI, $C_1DS_T/K$ is $-0.025$ and $C_1DS_T/d$ is $-1.25 \times 10^{-4}$, all in c.g.s. units.

Therefore, for operating conditions needed to produce 1,000 gallons of water from sea water at 20° C., when the mean temperature difference across the membrane is 15° C., the combinations of the following table are suitable. Here $Q_c$ is the amount of concentrate in gallons; $T_c$ is the temperature in ° C. of the concentrate; $Q_0$ is the amount of recycle fresh water in gallons; and $T_0$ is the temperature (°C.) of the fresh water recycle entering the unit. The temperature of product water is set at 30° C., and the temperature differential runs between 10° and 20° C. in the unit, with a mean difference of 15°. Examples V and VI are based on the recommended conditions of combination 4.

| Conditions No. | $Q_c$ | $Q_o$ | $T_c$(° C.) | $T_o$(° C.) | Heat Required B.t.u. |
|---|---|---|---|---|---|
| 1 | 250 | 352 | 84.3 | 104.3 | 390,000 |
| 2 | 333 | 430 | 75.6 | 95.6 | 430,000 |
| 3 | 500 | 590 | 64.0 | 84.0 | 480,000 |
| 4 [1] | 667 | 740 | 56.6 | 76.6 | 520,000 |
| 5 [1] | 1,000 | 1,000 | 47.7 | 67.7 | 560,000 |
| 6 | 2,000 | 1,620 | 36.2 | 56.2 | 640,000 |
| 7 | 4,000 | 2,420 | 28.9 | 48.9 | 690,000 |

[1] Recommended conditions.

It will be understood that it is intended to cover all changes and modifications of the examples of the invention herein chosen for the purpose of illustration which do not constitute departures from the spirit and scope of the invention.

I claim:

1. In separating water of reduced ion content from an aqueous solution containing electrolytes, by thermal diffusion through a fixed membrane, the process which comprises maintaining said solution in contact with the face of a membrane that is absorptive of water, insoluble therein, and electrolyte excluding, supplying substantially pure water to the back of the membrane, maintaining said water at a temperature at least 5° C. higher than the solution on the face, and withdrawing water that issues from the back.

2. The process of claim 1, said electrolyte being a salt and said diaphragm including, as the principal component, a cross-linked polymeric material.

3. The process of claim 1, said solution being a salt, and the temperature of the water on said back of the diaphragm being about 5°–30° C. higher than the solution on said face.

4. The process of claim 1, said solution being an aqueous saline solution and the diaphragm having as the principal component thereof a material selected from the group consisting of (1) polymers and copolymers of the N-lactams, $C_2$–$C_4$ alkylene oxides, and vinyl alcohol and (2) cellophane, cellulose acetate, and pyroxylin.

5. The process of claim 1, said diaphragm having as the principal component a cross-linked polymer of N-vinyl pyrrolidone.

6. In separating water from an aqueous saline solution by thermo-osmosis, the process which comprises moving said solution in contact with and over the face of a diaphragm of polymeric material that is absorptive of water but insoluble therein and has the property of excluding saline material, and passing water over and in contact with the back of the diaphragm, maintaining the movements and contacts so established at a temperature higher by at least 5° C. on the back than on the face of the diaphragm, and withdrawing water that issues from said back.

7. The process of claim 6, said polymeric material being cross-linked by a monomer having originally at least two ethenoid groups and being used in the proportion of about 0.1%–2% of the total weight of the cross-linked product.

References Cited by the Examiner

UNITED STATES PATENTS

| | | | |
|---|---|---|---|
| 2,574,533 | 11/1951 | Cornwell et al. | 210—23 |
| 2,829,944 | 4/1958 | Houtz. | |
| 2,861,038 | 11/1958 | Steinman et al. | 210—23 |
| 2,946,095 | 7/1960 | Beer | 264—216 |
| 2,960,462 | 11/1960 | Lee et al. | 208—308 |
| 2,984,623 | 5/1961 | Lee | 210—23 |
| 3,050,784 | 7/1962 | Jerothe | 264—216 |
| 3,061,569 | 10/1962 | Stoner et al. | 117—145 |
| 3,101,276 | 8/1963 | Hendricks | 117—145 |
| 3,111,425 | 11/1963 | Sheehan | 117—145 |
| 3,122,447 | 2/1964 | Sexsmith | 117—145 |
| 3,132,094 | 5/1964 | McKelvey | 210—500 X |

MORRIS O. WOLK, *Primary Examiner.*

JOSEPH SCOVRONEK, *Examiner.*

E. G. WHITBY, *Assistant Examiner.*